United States Patent [19]
Bombray et al.

[11] 4,217,500
[45] Aug. 12, 1980

[54] RADIODIAGNOSIS APPARATUS WITH REMOVABLE INTENSIFYING SCREENS

[75] Inventors: Marcel Bombray; Jean Caugant, both of Paris, France

[73] Assignee: Compagnie Generale de Radiologie, Paris, France

[21] Appl. No.: 7,896

[22] Filed: Jan. 30, 1979

[30] Foreign Application Priority Data

Feb. 3, 1978 [FR] France .............................. 78 03101

[51] Int. Cl.² .......................... A61B 6/00; G03B 41/16
[52] U.S. Cl. ............................ 250/469; 250/361 R; 250/480
[58] Field of Search .................. 250/361 R, 469, 480

[56] References Cited

U.S. PATENT DOCUMENTS

| | | | |
|---|---|---|---|
| 3,569,700 | 3/1971 | Quinn | 250/469 |
| 3,636,351 | 1/1972 | Lajus | 250/361 R |

Primary Examiner—Alfred E. Smith
Assistant Examiner—T. N. Grigsby
Attorney, Agent, or Firm—Roland Plottel

[57] ABSTRACT

The radiodiagnosis apparatus comprises intensifying screens required for radiography and has such structure that the screens and their supports can be very easily removed for radioscopy.

The radiodiagnosis apparatus according to the invention comprises an exposure device, including a frame (7) fixed to the radiodiagnosis apparatus in the exposure portion thereof and a removable drawer (8) supporting the intensifying screens sliding in this frame.

Application to radiodiagnosis apparatus utilizable alternately in radiography and radioscopy.

9 Claims, 2 Drawing Figures

Fig_1
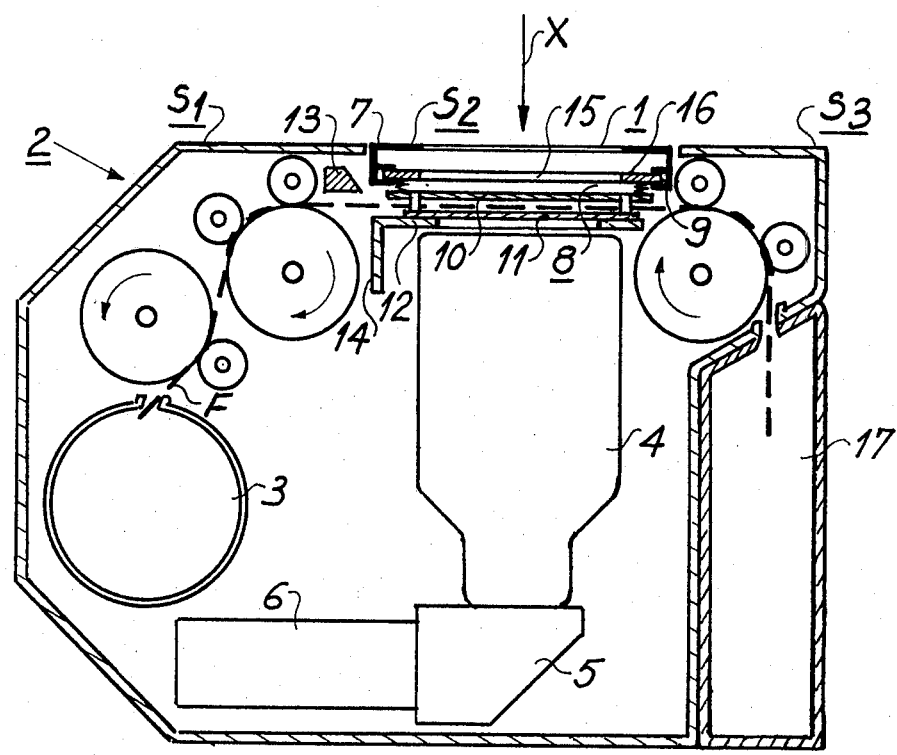

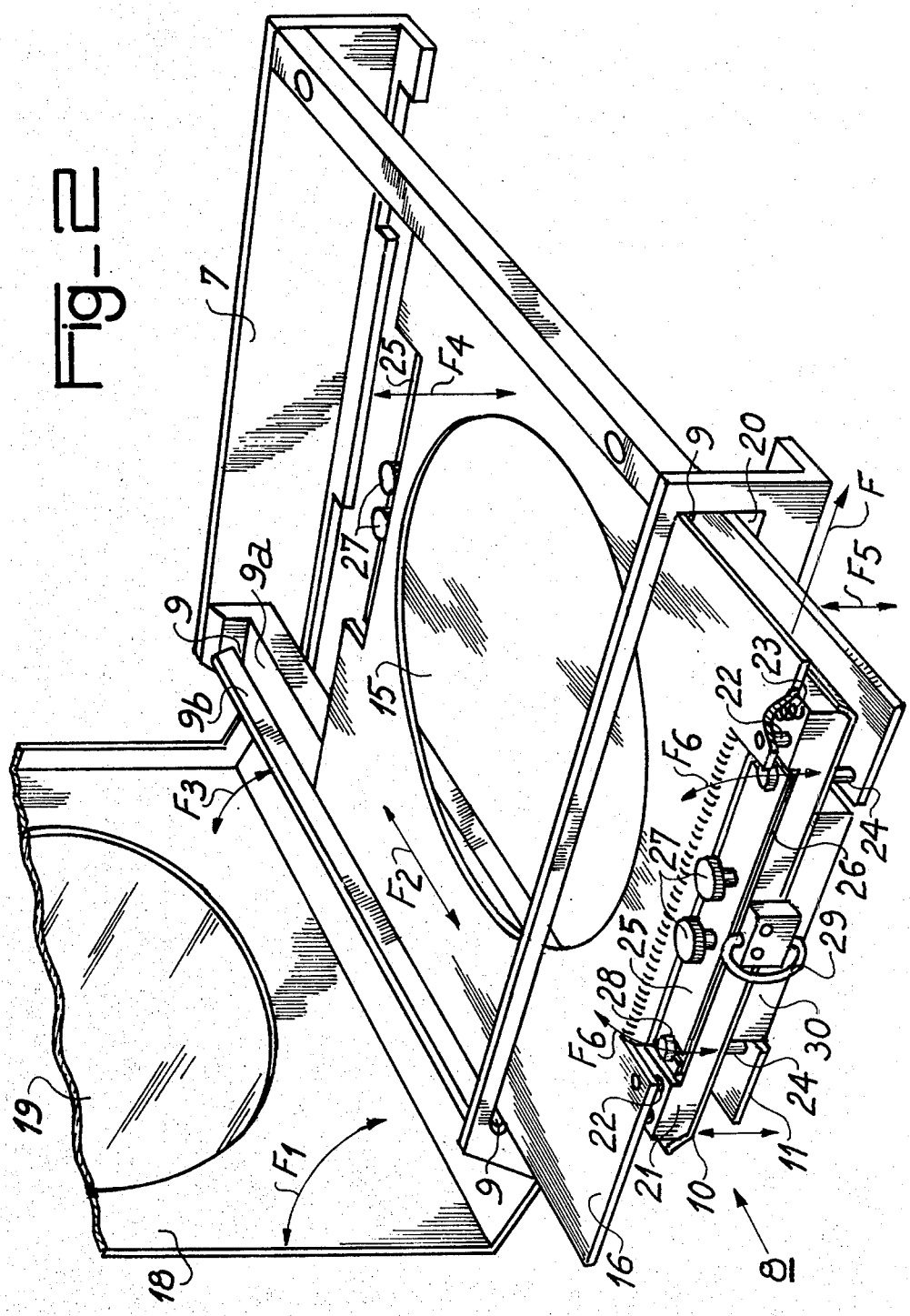

RADIODIAGNOSIS APPARATUS WITH REMOVABLE INTENSIFYING SCREENS

The present invention relates to a radiodiagnosis apparatus, including an exposure device with movable intensifying screens.

In radiodiagnosis apparatus, the image given of a body to be examined by an X-ray beam may be: stored on a radiological film, and it concerns radiography; or displayed without storage on a viewing screen, for example through a luminance amplifying tube, and it concerns radioscopy.

It is known that, when it concerns effective radioscopies, it is desirable that the exposure device of the apparatus, that is to say the device which will be traversed by the X-rays issuing from the body to be observed so as to form a radiological image on the display device, must be as little absorbent as possible so as to avoid deteriorating the image.

It is also well known that, when it concerns producing a radiograph, the film on which the image will be stored must be inserted between intensifying screens; these screens are, once the film is placed in position in the exposure field of the exposure device, pressed against the film by pressing plates on which they are fixed.

These two methods make it difficult to employ the same apparatus for effecting alternately radioscopic and radiographic examinations.

An U.S. Patent of the applicant (on Jan. 18, 1972 under No. 3,636,351) entitled "Combined X-ray film changer and X-ray transducer assembly for diagnostic apparatus" describes an apparatus which permits such alternating examinations, it being possible to remove the film from the exposure device when it concerns radioscopy.

The apparatus described in this patent however has certain drawbacks. Indeed, although a particular arrangement of the portions termed "loading", "exposure" and "ejection", and of the mechanisms for driving the film in these various portions permits, with no need for any handling, instantaneously emptying the exposure portion of any film, the exposure device still comprises the image intensifying screens and their support base; this is harmful to good radioscopy.

An object of the present invention is to provide an improved exposure device which is adaptable, for example, to an apparatus of the type described in the afore-mentioned patent and avoids the drawbacks thereof.

For this purpose, an exposure device for a radiodiagnosis apparatus, according to the invention, capable of being employed either in radiography or in radioscopy, comprises, on one hand, a frame fixed to the radiodiagnosis apparatus in its exposure field rendering the exposure zone light tight, and further comprises a removable drawer capable of sliding in the frame and supporting the intensifying screens, said drawer being removed from the frame for radioscopy by a sliding in direction perpendicular to the direction of displacement of the film.

Further features, objects and results of the invention will be apparent from the ensuing description with reference to the accompanying Figures in which;

FIG. 1 is a very diagrammatic view of a film changer according to the aforementioned U.S. Pat. No. 3,636,351 to which an exposure device according to the present invention has been adapted;

FIG. 2 is a perspective view of an exposure device of a radiodiagnosis apparatus according to the invention.

An exposure device 1 receiving the X-rays issuing from the body to be observed is diagrammatically represented in FIG. 1 in which it equips the exposure portion of a film changer 2 of the type described in the aforementioned U.S. Pat. No. 3,636,351. It will be understood that this use is given merely by way of example and that the device of the invention can equip other types of radiological apparatus for making either radioscopies or radiographs on a film passing through the apparatus.

In this embodiment, the film F issuing from a reel 3 and driven and guided in the loading portion $S_1$ by suitable means, arrives in the exposure portion $S_2$ which is equipped with the exposure device 1. Behind this device 1 there is, for example, a luminance amplifier 4 provided with its optical system 5 and a television camera 6.

The exposure device 1, which will be described in more detail in FIG. 2, mainly comprises a frame 7 which is fixed to the loading device 2 in a manner to be lighttight, and a removable drawer 8 which is slidable in slideways of the frame 7 in a direction perpendicular to the direction of displacement of the film F.

This drawer 8 comprises two plates 10 and 11 which support, on their confronting faces, the intensifying screens (not shown). The detailed fixing of these plates will be better explained with reference to FIG. 2. It is here sufficient to know that they are elastically mounted so that, when the film F is in position therebetween, and a pressing plate 12 actuates them (vertically as viewed in FIG. 1), they are applied against the film which is itself severed by the shearing action of two members 13 and 14. Note that the screen holding drawer 8 may be provided, in the opening 15 of the plate 16 for example, with a conventional antidiffusing grid (not shown).

The radiograph is thus taken when the pressing plate 12 presses the two screens on each side of the film. The pressing plate then redescends and the severed and exposed film is then taken up by the ejecting section $S_3$ where appropriate means convey it to a magazine 17.

When a radioscopy is to be taken, a trap door (not visible here) is opened on the side of the frame so as to give access to the movable drawer 8 which is then removed by sliding in a direction perpendicular to the plane of the Figure. There then remains, interposed between the X-rays and the luminance amplifier, merely the upper cover of the frame 7 of the exposure device. The image is thus as little attenuated as possible.

When radiographs have again to taken, it is sufficient to place the drawer 8 back in position by sliding it in the frame 7.

FIG. 2 shows in perspective and in more detail, an embodiment of the exposure device of the invention the essential features of which have been described with reference to FIG. 1 in which a number of elements were shown merely diagrammatically and even symbolically.

The frame 7 in which the drawer 8 will slide is closed in its upper part by a pivotal cover 18 (arrow $F_1$) which has a window 19 which is lightight and but slightly absorbent of X-rays.

The front side (FIG. 2) of the frame 7 has a rectangular opening 20 through which the drawer ( may be removed from, or placed in (arrow $F_2$), the frame. A trap dor (not shown) then closes this opening. The sliding of the drawer is ensured by the plate 16 which slides in slideways 9. Note that the slideway 9 shown on the left side of the figure is articulated, the part 9a thereof being fixed, whereas the part 9b is slightly pivotable (arrow $F_3$) so that it is possible to withdraw the drawer 8 through the top of the frame 7 (arrow $F_4$) when the cover 18 has been removed. This possibility is of interest when the sliding movement (arrow $F_2$) of the drawer 8 is jammed, for example owing to a bad positioning or a bad severing of the film 7; in this case, the drawer is removed through the top and device can be cleaned.

The plates 10 and 11 which support the screens are here both elastically mounted on the sliding plate 16. This arrangement is not the only possible arrangement but has the advantage of achieving a good pressure of the two screens on each side of the film.

The plate 10 is fixed to a plate 21 which is guided vertically by posts 22 rigid with the plate 16 and disposed in apertures of the plate 21. Return springs 23 hold the plate 21 and the plate 16 away from each other in the absence of application a vertical upward force (arrow $F_5$) on the lower plate 11 (by the pressing plate 12 which is not shown here).

The plate 21 further comprises apertures in which the posts rigid with the lower plate 11 move. a force applied upwardly in the direction of arrow $F_5$ by the pressing plate moves the plate 11 nearer to the plate 10. The return force which moves the plate 11 away from the plate 10 when the pressing plate descends, is here provided by a special elastic system. This system, which is of course not the only system possible, consists of an elastic strip 25 (or two strips 25 and 26) the centre part of which is fixed to the plate 21 by screws 27 and the ends of which include a slot 28 which is wedged in a notch formed on the periphery of the posts 24. When the force $F_5$ raises the plate 11, these notches raise the ends of the strips 25 and 26 (arrow $F_6$) which act as a return spring.

The plate 10 or 11, for example the lower plate 11, advantageously has a slightly curved convex profile in the centre thereof so that, when the plates 10 and 11 are moved closer on each side of the film, the air is suitably expelled from the centre toward the edges of the film.

A ring 29 enables the drawer 8 to be easily pulled. An elongated member 30, fixed to the plate 10 at each end of the drawer, acts as a guideway for the film F.

It will be clear that the two ends of the drawer 8, only one of which is visible in FIG. 2, are identical.

What is claimed is:

1. In a radiodiagnosis apparatus capable of being used either in radioscopy or radiography and equipped with an automatic film changer comprising:
    a loading portion for containing a supply roll of unexposed film;
    an exposure portion irradiated by a X-ray beam;
    and an ejecting and storage portion for the exposed film; the improvement consisting in providing in the exposure portion, upstream, relatively to the X-ray beam, of a luminance amplifying tube, an exposure device including on one hand, a frame fixed to the radiodiagnosis apparatus in its exposure portion rendering said region lighttight, and on the other hand, a removable drawer slidable in the frame and supporting two intensifying screens on each side of the film which arrives directly from the loading portion for radiography, said drawer being removed from the frame for radioscopy by a sliding thereof in the frame in a direction perpendicular to the direction of displacement of the film in the exposure device.

2. A radiodiagnosis apparatus as claimed in claim 1, wherein the side of the frame which receives the X-rays, comprises an openable cover, at least one of two slideways of the frame in which the drawer is slidable being capable of opening so as to permit the drawer to be removed from the side of the frame which is thus opened.

3. A radiodiagnosis apparatus as claimed in claim 1, wherein the removable drawer comprises a plate slidable in slideways of the frame and on which are fixed two plates supporting the intensifying screens, the last-mentioned two plates being fixed to the slidable plate in such manner as to move in a direction perpendicular to the plane of the film when a force is applied thereto at the moment of taking the radiograph and to then grip the film, elastic means separating them when this force is unapplied.

4. A radiodiagnosis apparatus as claimed in claim 3, wherein that one of the two intensifying screen-support plates which is adjacent to the slidable plate is mounted on the latter so as to be maintained spaced away therefrom by elastic means in the absence of said force, whereas the second plate supporting the intensifying screen is mounted on the first screen supporting plate so as to be maintained spaced away therefrom by elastic means in the absence of said force.

5. A radiodiagnosis apparatus as claimed in claim 4, wherein the first screen-support plate is movable under the action of said force along posts which are fixed to the slidable plate, springs placed between said two plates maintaining them spaced from each other in the absence of said force.

6. A radiodiagnosis apparatus as claimed in claim 5, wherein the second screen-support plate is maintained on the first screen-support plate by other posts which are movable in the first screen-support plate under the action of said force, and elastic strips maintain the two support-screen plates spaced away from each other in the absence of said force.

7. A radiodiagnosis apparatus as claimed in claim 6, wherein the elastic strips are rigidly fixed to the first screen-support plate in their centre part whereas their ends are fixed to the ends of said other posts which are not fixed to the second screen-support plate so that, under the action of said force, the centre part thereof follows the movement of the first plate and the ends thereof that of the second plate.

8. A radiodiagnosis apparatus as claimed in claim 3, wherein one of the intensifying screen-support plates is curved in the centre part thereof.

9. A radiodiagnosis apparatus as claimed in claim 1, wherein the removable drawer comprises an anti-diffusing grid.

* * * * *